United States Patent [19]

Pfeiffer

[11] Patent Number: 5,297,163
[45] Date of Patent: Mar. 22, 1994

[54] METHOD FOR PROCESSING SIGNALS FOR SIGNAL TRANSMISSION IN THE BASE BAND

[75] Inventor: Johann Pfeiffer, Vienna, Austria

[73] Assignee: Schrack Telecom-Aktiengesellschaft, Vienna, Austria

[21] Appl. No.: 708,015

[22] Filed: Jun. 3, 1991

[30] Foreign Application Priority Data

Jun. 1, 1990 [AT] Austria .................. 1200/90

[51] Int. Cl.$^5$ .......................... H04B 1/38; H04C 5/16
[52] U.S. Cl. ............................ 375/8; 375/17; 379/93; 370/32.1
[58] Field of Search .............. 375/8, 17, 122, 58, 375/34, 39, 121; 370/110.1, 92, 32, 32.1; 371/8.2, 43; 341/56; 380/9; 379/93

[56] References Cited

U.S. PATENT DOCUMENTS 3,781,873 12/1973 Nussbaumer .................. 375/18 X
4,924,492 5/1990 Gitlin et al. .................. 375/39 X

FOREIGN PATENT DOCUMENTS 0005808 5/1979 European Pat. Off. .
2103995 6/1977 Fed. Rep. of Germany .
WO8301360 3/1983 PCT Int'l Appl. .

Primary Examiner—Curtis Kuntz
Assistant Examiner—Tesfaldet Bocure
Attorney, Agent, or Firm—Cushman, Darby & Cushman

[57] ABSTRACT

The present invention relates to a method of using a modem for processing signals for signal transmission in the base band on a two-wire line. In order to reduce coupling to adjacent channels in the two-wire line, and to reduce effective line attenuation, it is proposed that the signal that is to be transmitted in a process of the above type be encoded such that each three transmit bits are combined to form a tri-bit, and one of eight discriminable sender levels for a main data channel are associated with each tri-bit, whereby the modulation rate of the symbols on the line is reduced to one-third of the bit rate.

5 Claims, 3 Drawing Sheets

FIG. 3

| PREVIOUS LINE-SYMBOL | DIGITAL INPUT (TRIBIT) | | | CURRENT LINE-SYMBOL |
|---|---|---|---|---|
| + | 0 | 0 | 0 | +1 |
| + | 0 | 0 | 1 | +3 |
| + | 0 | 1 | 0 | +5 |
| + | 0 | 1 | 1 | +7 |
| + | 1 | 0 | 0 | -1 |
| + | 1 | 0 | 1 | -3 |
| + | 1 | 1 | 0 | -5 |
| + | 1 | 1 | 1 | -7 |
| − | 0 | 0 | 0 | -1 |
| − | 0 | 0 | 1 | -3 |
| − | 0 | 1 | 0 | -5 |
| − | 0 | 1 | 1 | -7 |
| − | 1 | 0 | 0 | +1 |
| − | 1 | 0 | 1 | +3 |
| − | 1 | 1 | 0 | +5 |
| − | 1 | 1 | 1 | +7 |

METHOD FOR PROCESSING SIGNALS FOR SIGNAL TRANSMISSION IN THE BASE BAND

BACKGROUND OF THE INVENTION

Field of the Invention

The present invention relates to a method for processing signals for signal transmission in the base band in a two-wire circuit, using a modem.

SUMMARY OF THE INVENTION

In order to reduce coupling to adjacent channels in the two-wire circuit and to reduce effective line attenuation, in a process of the type described above, it has been proposed that the signal to be sent is encoded such that each three transmitted bits are combined to form a tri-bit, and one of eight discriminable transmitting levels be assigned to each tri-bit, whereby the modulation rate of the signals on the line is reduced to one-third of the bit rate.

BRIEF DESCRIPTION OF THE DRAWINGS

The present invention is described in greater detail below on the basis of an exemplary two-wire modem shown in the drawings appended hereto. These drawings show the following:

FIG. 3: The coding table for the coder shown in FIG. 2;

DETAILED DESCRIPTION OF THE PREFERRED EMBODIMENTS

Figure 1:
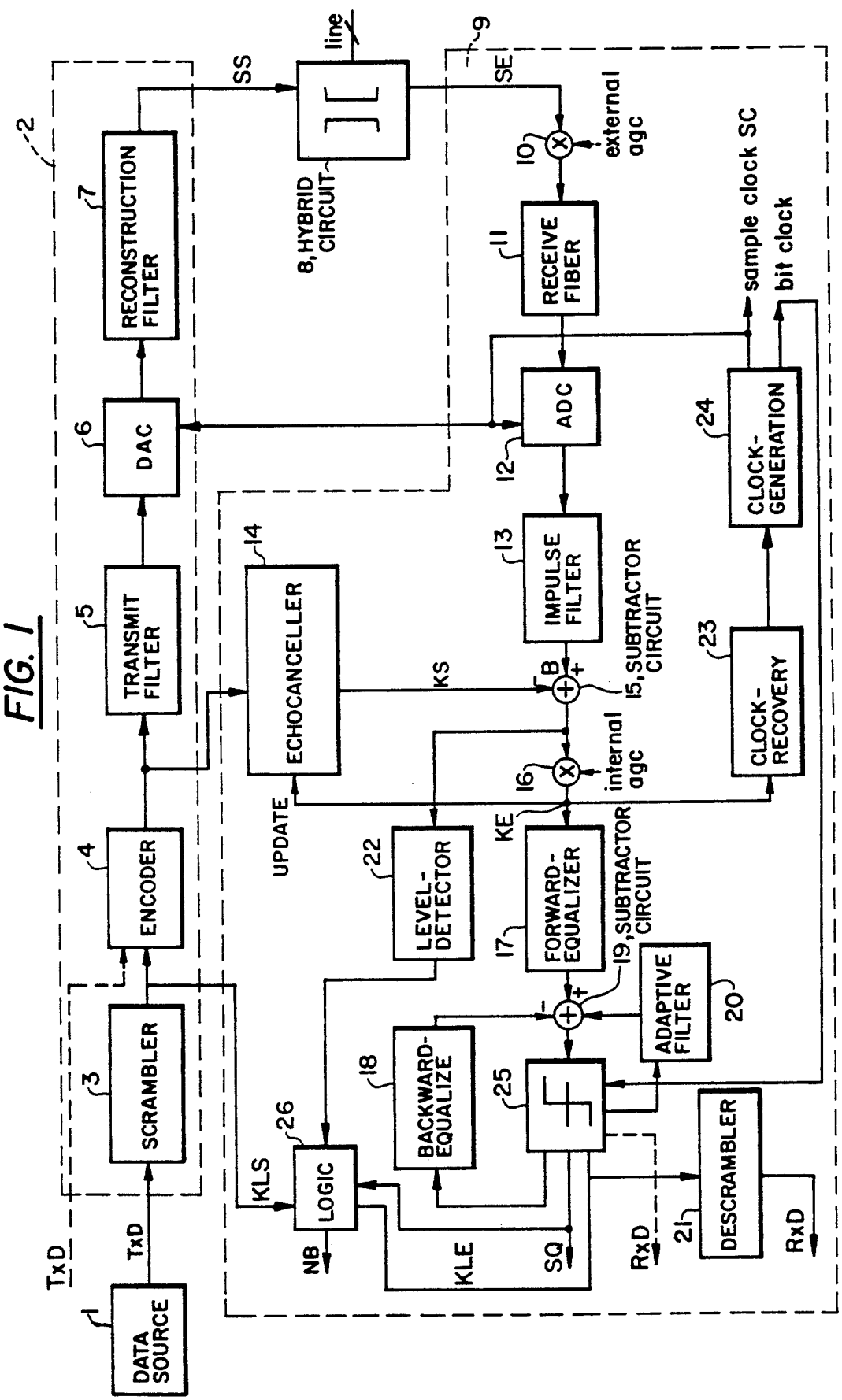
FIG. 1: A block circuit diagram of one embodiment of a two-wire modem that operates according to the present invention.

In the two-wire modem shown in FIG. 1, the binary or any other data that is transmitted from a data source 1 are input at input TxD of the transmit section 2 of the modem. The transmit section 2 forms an analog transmit signal SS that is provided to the transmitter-side input of the hybrid circuit 8, output at the line output of the hybrid circuit 8 and transmitted on a two-wire line to the second receiving data station. A signal arriving on the two-wire line is input as the receive signal SE to the input of a receive section 9 of the modem.

A signal RxD can be output at the output of the receive section 9, and this signal RxD represents the digital data that is received from the second transmitting data station. In addition, a signal SQ is generated, and this depends on the quality of the signal that is received; a signal NB is also generated, and this indicates whether or not the transfer channel can be assessed as interrupted.

The function of the transmit section is described in greater detail below.

The binary data that are supplied from the data source 1 are not subjected to any restrictions in their evaluation. The scrambler 3 that is connected immediately after the input of the transmit section transposes the data sequence according to an established and preselected algorithm to adjust the sequence of the logical states of the data sequence. That is, for example, a data series of longer duration can be split off from similar states by dummy data. A digital scramble signal then occurs at the output of the scrambler, and this is then converted in the encoder 4 to the type of signal that is most suitable for transmission on a two-wire line.

Figure 2:
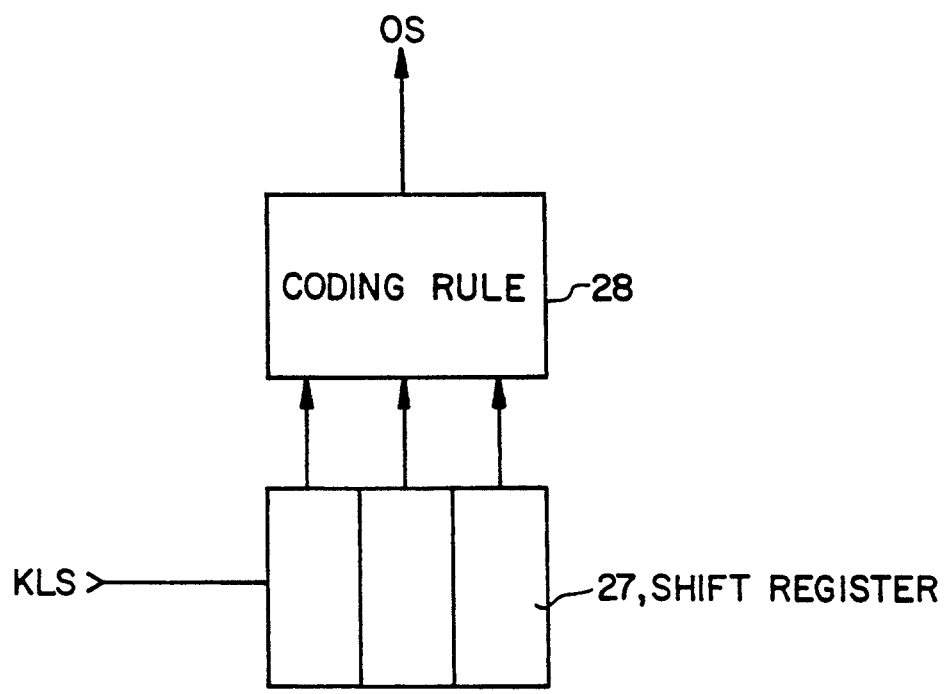
FIG. 2: A block circuit diagram of a possible embodiment of a coder for the two-wire modem shown in FIG. 1.

FIG. 2 explains the function of the encoder 4. A serial sequence of binary signs that are passed from the scrambler 3 are input to the encoder. Every three of these two-place signals are combined, for example, in a shift register 27 and form the input signal for the code converter 28 as a so-called tri-bit signal. The code converter 28 generates an output symbol that corresponds to the tri-bit signal that is input, regardless of the preceding output signal, and does this according to its coding table as described, for example, in FIG. 3, from the total of eight discriminable symbols that are provided. They correspond to the positive line levels $+1$, $+3$, $+5$, $+7$ and the negative levels $-1$, $-3$, $-5$, $-7$. This code, which is an octagonal three-unit code, is used, in particular, for the base-band transmission of signals on two-wire lines because, by nature of the type of the coding, it is of no consequence whether the two signal lines of the two-wire line have been confused during establishment of the connection.

Due to the compilative representation of each three bits of the input signal by an output symbol signal OS, the modulation rate of the signal transmitted on the line is reduced to one-third, relative to the data rate of the binary signals. This also means that the band width of the frequency band in which the signal is located on the line is reduced by a factor of three, which reduces cross talk with adjacent channels on the line and also reduces attenuation on the line because of the lower frequencies. In the event that in addition to the transmitted data, other data of an auxiliary channel is to be transmitted at a reduced data rate (data input TxDaux), the function of the coder is, for example, as described below.

The data on the main channel are coded in the same manner as is done without an additional auxiliary channel. If, however, a data bit on the auxiliary channel is to be transmitted, the level $+9$ or $-9$ that has been additionally introduced is transmitted, as soon as the transmission level $+7$, or $-7$, respectively, occurs in the main channel.

Since, in the time average, every fourth tri-bit of the main channel assumes the level $+7$ or $-7$, respectively, the data rate in the auxiliary channel is 1/12 that of the main channel. Without a dedicated multiplexer for both channels and without increasing the transmit symbol rate, this can only be achieved by a slight increase in transmission energy in order to generate the level $+9$ or $-9$, respectively.

The process for an auxiliary channel, described above, is also compatible for receiving data stations without a secondary channel system.

The eight-value or ten-value signal that is applied at the output of the encoder 4 has its band width limited in a transmit filter 5, in which connection the band width of the filter 5 is such that the inter-symbol distortion is as slight as possible. That is, the decay processes that occur unavoidably during bend limitation of a square wave signal display such 0-axis crossings that the subsequent transmit signals are interfered with as little as possible.

This transmit filter 5 can, for example, incorporate digital filtering in a signal processor. The digital output symbol signal of the transmit filter 5 is converted into an analog signal in a digital-analog converter 6 that is controlled by a sample clock SC, and this is then passed through a reconstruction filter 7 and is applied to the output of a hybrid circuit 8.

The frequency of the sampling clock SC is so selected that the sampling theorem is completed, i.e., such that during the time interval in which a transmit symbol is generated, a corresponding analog value is formed twice.

The reconstruction filter 7 is used to round off the jumps between the sequential analog values generated by the digital-analog converter, which corresponds to a limiting of the band width of the analog transmit signal. This is necessary because the harmonic of the signal that is otherwise present could lead to interference during transmission on a two-wire line.

Consequently, a signal SS is present at the output of the reconstruction filter 7, and this is coupled to the two-wire line through the hybrid circuit 8. When this is done, the hybrid circuit 8 acts as a two-wire/four-wire converter.

The operation of the receive section is described in greater detail below. The receive signal SE is coupled out from the two-wire line through the hybrid circuit 8 and is applied to the input of a receive amplifier 10 that incorporates an automatic gain control and which generates a signal of almost constant amplitude at its output, regardless of the current signal ratios, which is present at the input of a receive filter 11. Essentially, the receive filter 11 is a low-pass filter, the limiting frequency of which is selected in accordance with the desired transmission rate. Thus, at 64 kilobits/second, it is advantageous to use a band width of 15 kilohertz and at 120 kilobits/second a band width of 30 kilohertz.

The output signal of the filter is applied to the analog input of an analog-digital converter 12 which, controlled by the sample clock SC of a clock generator 24, applies a sequence of digital numbers (e.g. 12-bit values) as a map (image) of its input voltage. Hereafter, the expression "signal" is to be understood to be the curve of a value as represented by the sequence of digital values.

Due to the automatic gain control of the receive amplifier 10, the range of modulation of the analog-digital converter 12 is completely useable, and for this reason the receive signal can be digitized with the maximum possible resolution that is determined by the analog-digital converter. An impulse filter 13 that follows the analog-digital converter 12 generates an output signal that is as close as possible to a square wave and which resembles the transmit signal of the transmitting data station as closely as possible. The signal B that is present at the output of the impulse filter is thus composed essentially of the received information signal and the interference elements, which are made up, in particular, from part of the signal that is coupled through the hybrid circuit 8 into the receive section 9, and of echo signals that are generated by reflection of the signal at the jump points of the wave resistance of the line.

For this reason, a corrector signal KS is formed in an echo canceler 14, from the symbol signal OS and the inherent corrected receive signal by an auto-learning system, and this corrector signal KS copies of the above-described interference elements in the receive signal as accurately as possible. The corrector signal KS is subtracted from the output signal B of the impulse filter in a subtractor circuit 15.

Because the receive signal that has been corrected in this way is fed back to the echo canceler 14, it is now possible to free the receive signal almost completely of the above-discussed interference elements, so that the corrected receive signal contains elements from the transmit signal from the transmitting data station almost exclusively. The signal that results from this subtraction serves, on the one hand, as the input signal for a level detector 22, and, on the other hand, it is passed through a control amplifier 16 as a corrected receive signal KE and to the feedback input of the echo canceler 14, a clock recovery circuit 23 and a forward equalizer 17. The changes in the level of the receive signal that are caused by the corrector signal KS are evened out in the control amplifier 16.

A clock signal that corresponds to the transfer rate of the send symbols is derived from the corrected receive signal in the clock recovery circuit 23 and passed to the clock generator 24 as a synchronizing signal. This clock generator 24 generates the clock signal for the analog-digital or digital-analog converter from this signal and, by way of frequency multiplication, a bit clock (pulse) for the noise predictor and discriminator 25.

The corrected receive signal KE also is passed through a forward equalizer 17 in which almost all the distortion that the signal undergoes on the line between the transmitting and receiving data station is cancelled. This is largely possible to the point of a non-correctable delay, by a frequency response of the equalizer that is complementary to the transfer line. The output signal from the forward equalizer 17 is passed through a subtractor circuit 19 to the input of the noise predictor and discriminator 25.

Within the subtractor circuit 19, the output signal of a backward equalizer 18, which obtains its input signal from the noise predictor and the discriminator 25, and the output signal from an adaptor filter 20, which also gets its input signal from the noise predictor and discriminator 25, are subtracted from the corrected receive signal KE, and this forms the actual input value for the noise predictor and discriminator 25.

Figure 4:
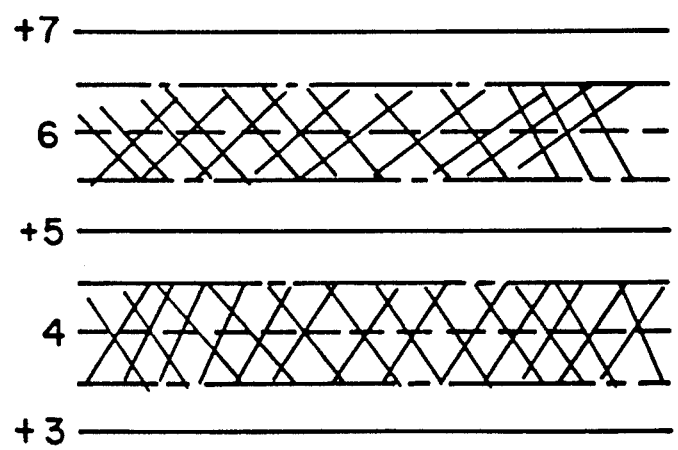
FIG. 4: The signal rating circuit of the noise predictor of the receive section of the two-wire modem shown in FIG. 1.

The reconversion of the eight-value line signal to a binary signal is carried out in the noise predictor and discriminator 25. To this end, the whole range of values for the binary signal is divided into eight sub-ranges, $+7, +5, +3, +1, -1, -3, -5, -7$, each value range being separated from the adjacent one by a prohibited range, such as $+6, +4, +2, 0, -2, -4, -6$ (see FIG. 4).

If the current value of the binary signal now lies in a prohibited range, then, on one hand, an output signal SQ is generated, and this indicates that signal quality is poor; in addition, an error signal at the adaptive filter 20 is used to attempt to influence the corrected receive signal KE such that prohibited states such as this occur as seldom as possible. By this means, sequential errors are reduced.

If the current value of the binary signal is within a permitted range, good signal quantity is indicated by the output signal SQ. Subsequently, within the noise predictor and discriminator 25, the binary signal is identified according to the eight sub-ranges for the signal value as one of eight possible symbols, and a tri-bit is associated to the symbol according to a coding table, e.g., as described in FIG. 3, and the three-bit word is then serialized. This serial binary receive signal can be tapped off at a further output of the noise predictor and discriminator 25, and is converted into the binary receive signal RxD in a descrambler 21 using an algorithm that is complementary to the scrambler 3 in this transmit section and this (RxD) is present at the receive data output of the receive section.

In the event that the receive section incorporates an auxiliary channel system, the additionally possible signal level +9 or −9 is identified and the receive data signal for the auxiliary channel, which can be tapped off at another output RxDaux, is formed in a process that is complementary to the encoder.

A further output of the noise predictor and discriminator 25 controls a backward equalizer 18 which, by using the already encoded signal, partially cancels additional distortion which occurs, for example, in the transfer channel by cross-talk between adjacent channels, by subtraction of a corrector signal within the subtractor 19. Thus, by using a forward equalizer 17 and a backward equalizer 18, almost all of the distortion caused by the transfer characteristics of the signal path from the transmitter to the receiver are eliminated.

In addition, there is a logic circuit 26 in the receive section 9, within which a signal NB (not ready) is generated and this indicates whether or not the transfer channel between the transmitter and the receiver has been broken. To this end, the output signal from the level detector 22 is analyzed. If the amplitude of the receive signal is too small, it can be assumed that the transfer channel has been disrupted or broken.

In the event of a sudden interruption of the transfer channel, essentially, the signal that is coupled in through the hybrid circuit 8 will no longer be at the input of the receive section 9 and inherent reflected signal is reflected at the point of the break in the transmission channel. Due to the sudden mismatch of the hybrid circuit because of interference in the transfer channel, these signals can be significantly larger than they are in normal operation. However, the echo canceler 14 needs a certain amount of time to compensate for the inherent reflected signal by subtraction of the corrector signal in the subtractor 15.

In the meantime, the level detector 22 would identify a sufficiently large receive signal and report this to the logic unit. For this reason, the digital scramble signal KLS and the decoded receive signal KLE are input to the logic circuit 26, at other inputs. By correlation of these two signals, it is possible to determine, within the logic circuit 26, whether or not the receive data correspond to the transmit data (line interruption) or represent valid receive data.

The results of this analysis can be made dependent on the quality of the receive signal through an additional input of the logic circuit 26, to which the signal SQ is applied. Finally, the output signal NB from the logic circuit 26 indicates whether the transfer channel has been disrupted or is sufficient.

I claim:

1. A method of using a modem for transmitting at least a transmit signal and receiving a receive signal in a base band on a two-wire line comprising the steps of:

receiving an input signal in a transmitting unit, said input signal having a plurality of data bits;

scrambling said input signal to form a scramble signal having said plurality of data bits;

encoding a predetermined amount of consecutive said data bits of said scramble signal to form a transmit symbol signal in accordance therewith;

generating said transmit signal in accordance with said transmit symbol signal;

transmitting said transmit signal;

receiving in a receiving unit said receive signal and generating a received symbol signal in accordance therewith;

generating a correction signal in a feedback-loop by analyzing a corrected received symbol signal and said transmit symbol signal, said corrected received symbol signal being generated by combining said correction signal with said received symbol signal in said feedback-loop;

determining whether a signal level of said corrected received symbol signal is within a predetermined signal level range and generating a range-indicator signal in accordance therewith;

decoding said corrected received symbol signal to form an output signal having an output signal level and a plurality of data bits; and logically comparing said output signal level of said output signal to said scramble signal level of said scramble signal to determine it at least one of transmission of said transmit signal and receipt of said receive signal is interrupted.

2. A method as claimed in claim 1, further comprising the steps of:

receiving a second input signal in said transmission unit and generating a second symbol signal in accordance therewith;

generating a third data signal in accordance with said second symbol signal;

transmitting said third data signal.

3. A method as claimed in claim 2, wherein said third data signal is transmitted at a rate less than a rate of transmission of said first data signal.

4. A method as claimed in claim 1, wherein:

said combining step combines three of said consecutive said data bits; and said symbol signal represents one of a predetermined number of transmit values of said first data signal.

5. A method as claimed in claim 1, further comprising the steps of:

generating an error signal when the determining step determines that said corrected received symbol signal is not within said predetermined signal level range; and adjusting said corrected received symbol signal to be within said predetermined signal level range in response to said error signal.

* * * * *